US007643427B2

(12) United States Patent
Kokku et al.

(10) Patent No.: US 7,643,427 B2
(45) Date of Patent: Jan. 5, 2010

(54) MULTIPATH ROUTING ARCHITECTURE FOR LARGE DATA TRANSFERS

(75) Inventors: Ravindranath Kokku, Lawrenceville, NJ (US); Aniruddha Bohra, Edison, NJ (US); Samrat Ganguly, Monmouth Junction, NJ (US); Rauf Izmailov, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 408 days.

(21) Appl. No.: 11/690,942

(22) Filed: Mar. 26, 2007

(65) Prior Publication Data
US 2007/0230352 A1    Oct. 4, 2007

Related U.S. Application Data

(60) Provisional application No. 60/743,846, filed on Mar. 28, 2006, provisional application No. 60/804,674, filed on Jun. 14, 2006.

(51) Int. Cl.
*H04J 3/14* (2006.01)
(52) U.S. Cl. .................. 370/238; 370/237; 709/235; 709/239
(58) Field of Classification Search .......... None
See application file for complete search history.

(56) References Cited

U.S. PATENT DOCUMENTS 6,738,352 B1 * 5/2004 Yamada et al. ............. 370/238

2005/0086363 A1 * 4/2005 Ji .............................. 709/235
2006/0133282 A1 * 6/2006 Ramasamy ................. 370/238
2006/0198305 A1 * 9/2006 Hamdi ....................... 370/232
2007/0053300 A1 * 3/2007 Zhu et al. ................... 370/238
2008/0186863 A1 * 8/2008 Baratakke et al. .......... 370/237

OTHER PUBLICATIONS

Improving TCP Performance over Wireless Networks with Collaborative Multi-homed Mobile Hosts; Kyu-Han Kim, et al.; USENIX Association; The Third International Conference on Mobile Systems, Applications and Services, MobiSys '05.
Emulating Low-priority Transport at the Application Layer: A Background Transfer Service; Peter Key, et al.; SIGMETRICS/Performance'04, Jun. 12-16, 2004, New York, NY.

(Continued)

*Primary Examiner*—Ricky Ngo
*Assistant Examiner*—Rasheed Gidado
(74) *Attorney, Agent, or Firm*—Joseph J. Kolodka

(57) ABSTRACT

A multipath routing architecture for large data transfers is disclosed. The architecture employs an overlay network that provides diverse paths for packets from communicating end hosts to utilize as much capacity as available across multiple paths while ensuring network-wide fair allocation of resources across competing data transfers. A set of transit nodes are interposed between the end-hosts and for each end-to-end connection, a transit node can logically operate as an entry gateway, a relay or exit gateway. Packets from the sender enter the entry node and go to the exit node either directly or through one of a plurality of relay nodes. The exit node delivers the packets to the receiver. A multipath congestion control protocol is executed on the entry node to harness network capacity for large data transfers.

7 Claims, 5 Drawing Sheets

OTHER PUBLICATIONS

Stability of end-to-end algorithms for joint routing and rate control; Frank Kelly, et al.; Statistical Laboratory, University of Cambridge, U.K.; ACM SIGCOMM, vol. 35, Issue 2, Apr. 2005.

A Transport Layer Approach for Achieving Aggregate Bandwidths on Multi-homed Mobile Hosts; Hung-Yun Hsieh, et al.; Georgia Institute of Technology; MOBICOM'02, Sep. 23-26, 2002, Atlanta GA.

MPAT: Aggregate TCP Congestion Management as a Building Block for Internet QoS; Manpreet Singh, et al.; Cornell University, IBM T.J. Watson Research Center, 2004.

A Transport Layer Approach for Improving End-to-End Performance and Robustness Using Redundant Paths; Ming Zhang, et al.; PROC of the USENIX, Annual Technical Conference, Jun. 2004.

TCP Nice: A Mechanism for Background Transfers; Arun Venkataramani, et. al.; Laboratory of Advanced Systems Research; University of Texas, Austin, TX; ACM SIGOPS Operating Systems Review, 2002.

OverQoS: An Overlay based Architecture for Enhancing Internet QoS; Lakshminarayanan Subramanian, et al.; PROC $1^{st}$ Symposium on Networked System Design and Implementation (NSDI), Mar. 2004.

Best-Path vs. Multi-Path Overlay Routing; David G. Andersen, et al.; IMC'03, Miami Beach, FL., Oct. 27-29, 2003.

TCP-LP: A Distributed Algorithm for Low Priority Data Transfer; Aleksandar Kuzmanovic, et al., Department of Electrical and Computer Engineering, Rice University; IEEE INFOCOM, 2003.

Rate control for communication networks: shadow prices, proportional fairness and stability; F. P. Kelly, et al.; Journal of the Operational Research Society, vol. 49, 1998.

\* cited by examiner

MULTIPATH ROUTING ARCHITECTURE FOR LARGE DATA TRANSFERS

CROSS REFERENCE TO RELATED APPLICATIONS

This non-provisional application claims the benefit of U.S. Provisional Application Ser. No. 60/804,674, filed on Jun. 14, 2006, and U.S. Provisional Application Ser. No. 60/743,846 filed on Mar. 28, 2006, both entitled "A Multipath Routing Architecture for Background Data Transfers, the contents of which are hereby incorporated by reference herein.

FIELD OF THE INVENTION

The present invention relates generally to communication networks, and more particularly, to a multipath routing architecture and congestion control protocol for harnessing network capacity across multiple Internet paths for point-to-point large data transfers.

BACKGROUND OF THE INVENTION

Large (or Bulk) data transfers dominate Internet traffic today. Examples of such data transfers include peer-to-peer file sharing, content distribution, remote backups and software updates. A recent study suggests that up to 90% of bytes traversing the Internet may be bulk data in nature. Bulk of this data is transferred between a sender and a receiver using point-to-point transport-level protocols such as TCP.

In today's Internet, packets of a point-to-point transport-level connection from one end-host to another often traverse a single network path (comprised of a set of routers and links). This can cause high load on some paths, while underutilization on others, thereby leading to lower throughput on several connections.

In general, the goal of a network architecture is to achieve high utilization, fairness of network resource allocation, and stability. A unipath network like the Internet cleanly separates routing and congestion control. Thus, fairness of network resource allocation simply reduces to a fair sending rate on a path independent of other paths. For example, a TCP-fair resource allocation simply means a sending rate inversely proportional to the round-trip time (RTT) and square root of the loss rate on the path. Other notions of fairness include max-min, proportional fairness, and the like. For example, a max-min fair allocation is an allocation that maximizes the minimum sending rate while satisfying link capacity constraints.

In a multipath network, fairness of resource allocation takes on an analogous network-wide meaning, and is defined over the aggregate sending rates of users in the system. Each user is a source-destination pair and has potentially multiple paths available. For example, informally, a max-min fair allocation is one that maximizes the minimum aggregate rate of a user in the network while satisfying link capacity constraints.

A utility-theoretic framework permits the generalization of unipath congestion controllers (e.g., TCP) and associated notions of fairness in a multipath network. See F. Kelly, A. Maulloo, and D. Tan, Rate Control in Communication Networks: Shadow Prices, Proportional Fairness and Stability, In *Journal of the Operational Research Society*, volume 49, 1998. This framework allows one to view different congestion controllers as distributed algorithms to optimize a global objective function defined in terms of individual utilities $U(x)$ for each user as a function of his sending rate x. Different definitions of $U(x)$ yield different kinds of fairness properties. The multipath scenario cleanly extends this framework by retaining well-understood utility functions (corresponding to different fairness schemes) with the unipath sending rate simply replaced by the aggregate multipath sending rate. A multipath congestion controller specifies how to control the rates on a set of paths to achieve the corresponding level of fairness of resource allocation.

Multipath routing and congestion control is a powerful architectural building block to improve utilization and fairness of resource allocation in a network, and end-to-end reliability. It would therefore be desirable to provide a multipath network architecture to support large data transfers as an edge service.

A recently proposed transport-level multipath solution, mTCP, modifies the network protocol stack at the end-hosts to utilize multiple paths. See M. Zhang, J. Lai, A. Krishnamurthy, L. Peterson, R. Wang, A Transport Layer Approach for Improving End-to-end Performance and Robustness Using Redundant Paths, In *Proc*. of Usenix Annual Technical Conference, June 2004. This approach has two problems: First, modifying the network stack (that is often implemented in the operating system) is a significant barrier to widespread use because of the reluctance of users to upgrade operating systems unless they are stable and reliable releases. Second, mTCP uses independent congestion control on each path that may not ensure fair allocation of network resources. The present invention involves defining a multipath network architecture that addresses the above two problems.

SUMMARY OF THE INVENTION

The present invention involves defining a multipath network architecture that harnesses network capacity across several paths while ensuring fair allocation across competing data transfers.

In accordance with an aspect of the invention, a method is provided for facilitating large data transfers between a sender and a receiver (point-to-point) through a network comprising an entry node communicating with the sender, an exit node communicating with the receiver, and a plurality of paths between the entry node and the exit node, at least one of the plurality of paths being via at least one relay node between the entry node and the exit node to provide multipath routing of packets between the entry node and the exit node. The method comprises the steps of: receiving packets from the sender at the entry node; at the entry node, selecting at least one path among the plurality of paths over which to send the packets to the exit node, the selection of the at least one path being a function of path congestion; sending the packets from the entry node to the exit node via the at least one path among the plurality of paths between the entry node and exit node; reordering the packets received at the exit node; and sending the reordered packets from the exit node to the receiver.

The method further comprises executing a multi-path congestion control protocol at the exit node to detect congestion on each path between the entry node and the exit node based on packet delays and packet losses, and executing a multipath congestion control protocol at the entry node to estimate the size of a congestion window for each path that indicates a stable sending rate for each path. The congestion control protocol uses a multiplicative increase multiplicative decrease (MIMD) protocol to control the size of the congestion window for each path.

These and other advantages of the invention will be apparent to those of ordinary skill in the art by reference to the following detailed description and the accompanying drawings.

DETAILED DESCRIPTION OF THE INVENTION

Figure 1:
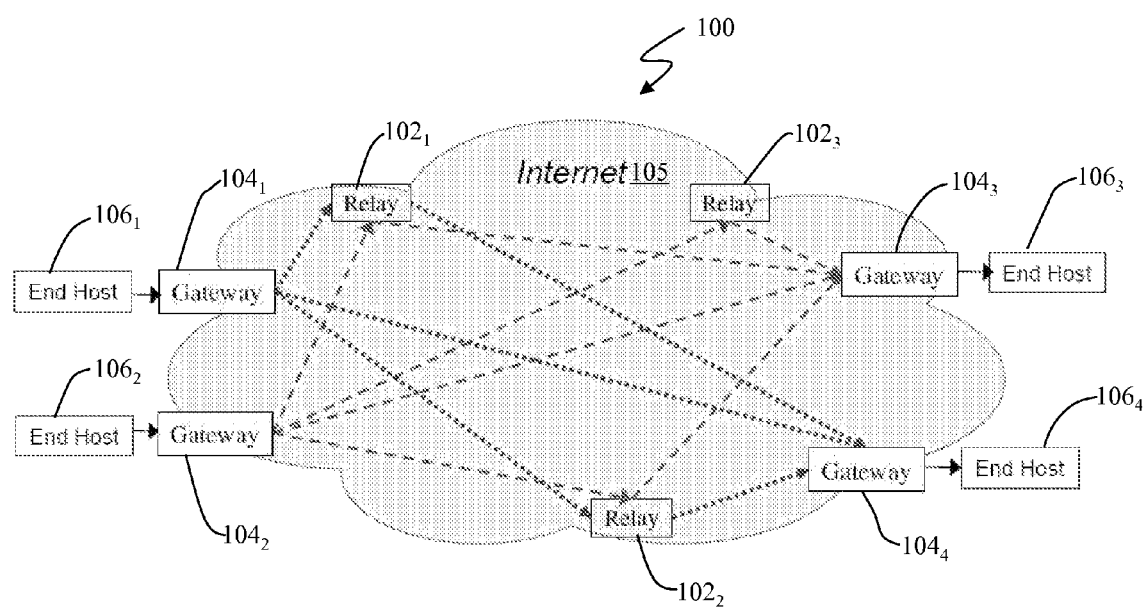
FIG. 1 is a schematic of an exemplary network architecture in accordance with an aspect of the invention.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. While individual functional blocks and components are shown in the drawings, those skilled in the art will appreciate that these functions can be performed by software modules or programs executed using a suitably programmed digital microprocessor or general purpose computer by individual hardware circuits, by an application specific integrated circuit, and or by one or more digital signal processors.

FIG. 1 is a schematic of an exemplary network architecture 100 in accordance with an aspect of the invention. The overlay network 100 comprises two types of transit nodes, identified as relay nodes $102_1$, $102_2$ and $102_3$ and gateway nodes $104_1$, $104_2$ ... $104_4$. Such a deployment scenario can be implemented where an edge service provider supports such relays distributed across the Internet to enable multipath routing, and organizations install gateways at their network exits. End hosts $106_1$, $106_2$ ... $106_4$ communicate with the Internet 108 via their respective gateway node $104_1$, $104_2$ ... $104_4$. Multiple paths depicted by the connecting lines between the gateway nodes $104_1$, $104_2$ ... $104_4$ and the relay nodes $102_1$, $102_2$ and $102_3$ enable the overlay network 100 to aggressively exploit the path diversity and load imbalance in the Internet 105 to seek and utilize paths with abundant capacity. In accordance with an aspect of the present invention, a multipath congestion control algorithm is employed to provide improved utilization and a fair allocation of network-wide resources. This is described in further detail below.

Figure 2:
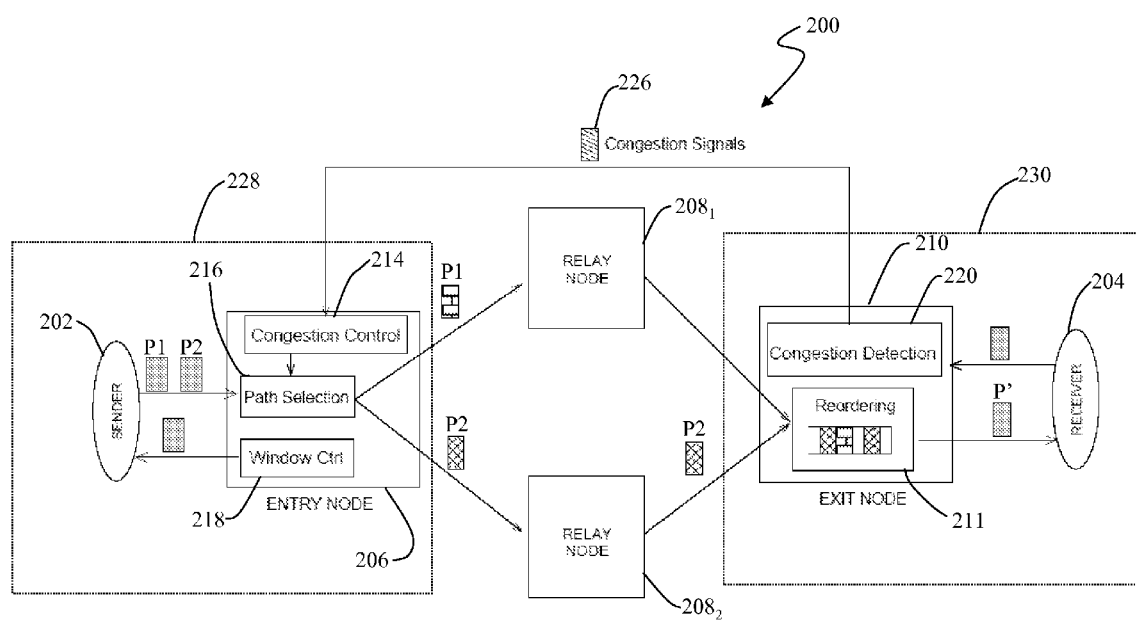
FIG. 2 is a schematic of the overlay network architecture, showing details of how packets from a sender to a receiver are routed from an entry node to an exit node over multiple paths in the network and delivered to the receiver by the exit node in accordance with an aspect of the invention.

FIG. 2 is a schematic of a multipath routing network 200 for providing support for large data transfers in accordance with an aspect of the invention. To avoid having to modify the end hosts 202 and 204, an edge service is provided that utilizes a set of transit nodes. For each end-to-end connection, a transit node can logically operate as an entry gateway or node 206, as relay nodes $208_1$ or $208_2$, and an exit gateway or node 210. A transmitting end host 202 communicates with the entry node 206. Packets P1 and P2 from end host 202 enter the entry node 206, and are communicated to the exit node 210 either directly or via one of the relay nodes $208_1$ or $208_2$. The exit node 210 reorders the packets in a reorder queue 211 as P' and delivers P' to the receiving end host 204. Acknowledgments generated by the receiving node 204 for all packets are sent back directly from the exit node 210 to the entry node 206. Each entry node contains a congestion control module 214, path selection module 216 and window control module 218. Exit node 210 includes a congestion detection module 220 for detecting congestion on incoming paths as a result of packet delays or packet losses. When congestion is detected at the exit node 210, congestion signals are communicated back to the entry node 206. In an alternative embodiment, it will be appreciated by those skilled in the art that the functions of the end host 202 and entry node 206 (host gateway) may be implemented on a single network access device 228. Similarly, the functions of the exit node 210 and the end host 204 may take place on a single network access device 230. FIG. 2 depicts a logical separation of these components. In this regard, the end host 202 may be an application running on network access device 228 and the entry node 206 is an agent running on network access device 228. Likewise, the end host 204 is an application running on network access device 230 and the exit node 210 is an agent running on network access device 230. Furthermore, the entry and exit node architectures can be implemented on any router in the network 200.

In order to maximize bandwidth utilization on multiple paths while ensuring fair allocation of network resources, the multipath routing network 200 implements a congestion control algorithm based on a modified Kelly Voice (KV) multipath routing and congestion controller, TCP Nice, and TCP-LP, see, F. Kelly and T. Voice, Stability of end-to-end Algorithms for Joint Routing and Rate Control, *SIGCOMM Comput. Commun. Rev.*, 35(2):5-12, 2005; A. Venkatramani, R. Kokku, and M. Dahlin, TCP-Nice: A Mechanism for Background Transfers, In *Proc.* of OSDI, 2002, and A. Kuzmanovic and E. W. Knightly; TCP-LP: A Distributed Algorithm for Low Priority Data Transfer, In Proc. of *INFOCOM*, 2003 the contents of which are hereby incorporated by reference herein.

Multipath Congestion Control

A congestion control algorithm is executed by module 214 on the entry node 206. Given a set of paths on which packets may be sent, the congestion control module 214 estimates the size of the congestion window on each path that indicates a stable sending rate on the path. In accordance with an aspect of the invention, the congestion control module uses a multiplicative increase multiplicative decrease (MIMD) scheme. For multiplicative increase (MI): on each positive acknowledgment on a path, increment the congestion window of the path by a MI parameter $\alpha$. For multiplicative decrease (MD): on a congestion signal on a path, decrement the window of the path by an MD parameter $\beta$ times the weighted sum of the congestion window on the current path ($w_i$) and the total congestion window on all paths (W). The following is an exemplary congestion control algorithm executed by the congestion control module:

```
1: Definitions: i: path (numbered from 1 to n)
2: w_i: congestion control window (in bytes) on path i;

3:
    W: total congestion window = Σ_1^n Wi

4:
5: On ack for path i
6: w_i ← w_{i+α}
7:
8: On delay signal for path i
9: w_i ← max(1, w_i − β × (w_i × ξ + W × (1 − ξ)))
10:
11: On loss signal for path i
12: w_i ← max(1, w_i − W/2)
```

The congestion control algorithm shows the pseudo code of the above described congestion control methodology. The MI is represented by $w_i \leftarrow w_{i+\alpha}$. MD is represented by $w_i \leftarrow \max(1, w_i - \beta \times (w_i \times \xi + W \times (1-\xi)))$ and $w_i \leftarrow \max(1, w_i - W/2)$. To prevent over-reacting to congestion indications and ensure stability, the congestion window is decremented only once per-round trip time on a path after observing a threshold number of congestion indications. In addition, the window is not incremented within one round-trip time of the previous decrement. Setting the value of $\xi$ to different values permits several variants of multipath control as described in the following sections. There are three types of control variants, classified as independent, joint and adaptive.

Independent: $\xi=1$ makes the multiplicative decrease on a path proportional to the sending rate on that path. This is the same as independent congestion control on each path, i.e., each path operates as an individual TCP flow. See M. Zhang et al., A Transport Layer Approach for Improving End-to-End Performance and Robustness Using Redundant Paths, In *Proc. of the USENIX* 2004, which is hereby incorporated by reference herein. Thus, a multipath connection using such an independent control variant with n paths operates as n TCP flows.

Joint: $\xi=0$ makes the multiplicative decrease similar to that of a joint routing and congestion control as disclosed in H. Han et al., Multi-path TCP: A Joint Congestion Control and Routing Scheme to Exploit Path Diversity in the Internet, In *IMA Workshop on Measurements and Modeling of the Internet*, 2004, which is hereby incorporated by reference herein and F. Kelly and T. Voice, supra.

Figure 3:
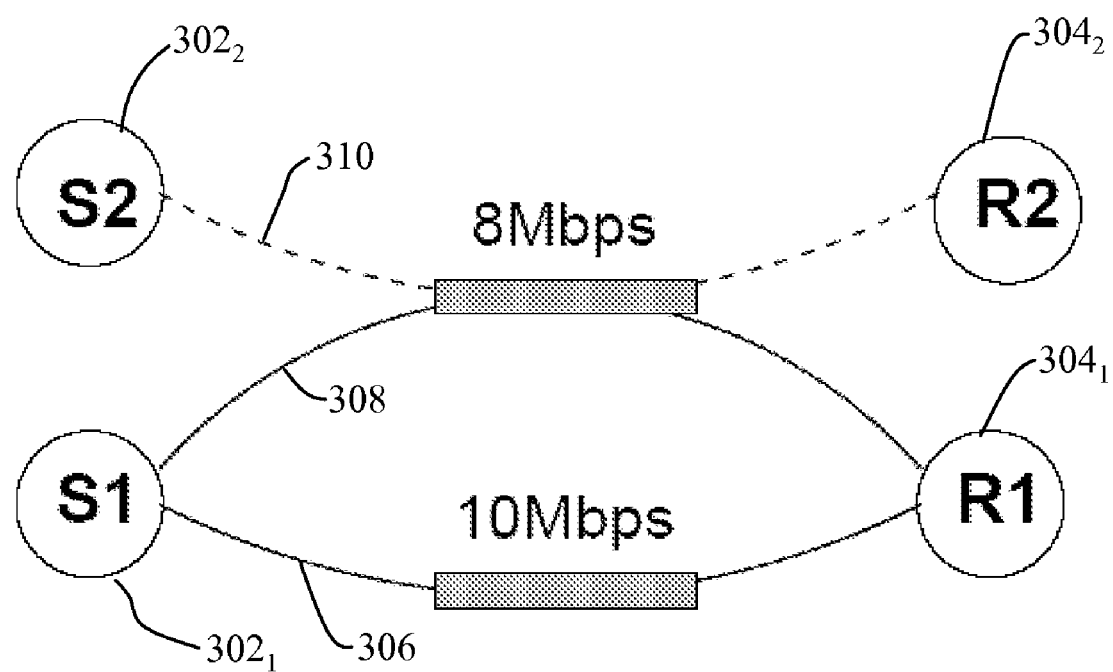
FIG. 3 is a schematic of multiple senders sharing a common path vs. a single path for illustrating an aspect of the invention.

FIG. 3 is a schematic illustrating the above multipath congestion control variants for a pair of senders $302_1$ (S1) and $302_2$ (S2) that communicate with receivers $304_1$ (R1) and $304_2$ (R2). The sender/receiver pair $302_1$-$304_1$ has access to two paths 306 and 308. The sender/receiver pair $302_2$-$304_2$ has access to one path 310 that is shared with path 308. Using the independent variant, sender/receiver pair $302_1$-$304_1$ gets an equal share of bandwidth on the path 308 shared with path 310 between sender/receiver pair $302_2$-$304_2$. This leads to a higher bandwidth allocation to sender/receiver pair $302_1$-$304_1$ as compared to sender/receiver pair $302_2$-$304_2$. Using the joint variant, moves each transfer to the best set of paths, where sender/receiver pair $302_1$-$304_1$ occupies only path 306 (10 Mbps) and sender/receiver pair $302_2$-$304_2$ occupies path 310 (8 Mbps), thus providing a fairer allocation of resources.

If sender/receiver pair $302_1$-$304_1$ is the only transfer, however, this can lead to under-utilization of capacity on a path. This occurs because even if sender/receiver pair $302_1$-$304_1$ is the only transfer on the path, the transfer backs off proportionally to the cumulative congestion window on all paths. This results in the loss of greater throughput than using the independent variant. Thus, the features of the independent and joint variants may be combined in an adaptive control in accordance with an aspect of the invention.

$$\text{Adaptive: } \xi = \frac{w_i}{M_i},$$

where $w_i$ is the congestion control window during decrement, and $M_i$ is the maximum congestion window size observed by the transfer on path i. The adaptive control variant has the following properties. When a multipath connection is the only one that is active on one or more of its paths, the multiplicative decrement on such paths behaves more like the independent control variant because $w_i$ is close to $M_i$. As the number of transfers sharing the path increases, the characteristics of adaptive control variant will become more like the joint control variant. To ensure best performance, each transfer should observe the maximum congestion window $M_i$.

Path Selection

Figure 4:
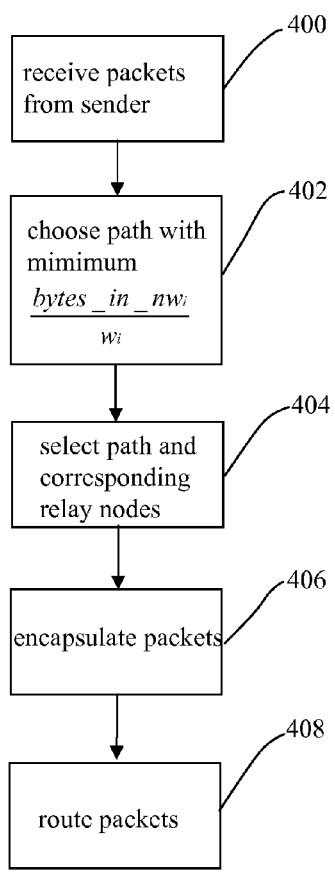
FIG. 4 is a flow diagram of a path selection process at an entry node in the network of FIG. 2.

Referring now to FIG. 4, there is depicted a path selection process at the entry node 206 (see FIG. 2). At step 400, a packet arrives from sender 202 (see FIG. 2). At step 402, the entry node 206 attempts to balance load across available paths by choosing for each packet (e.g., P1, P2 . . . ) a path with a minimum $$\frac{\text{bytes\_in\_nw}_i}{w_i},$$

where bytes_in_nw$_i$ represents the number of unacknowledged bytes sent on path i and $w_i$ represents the size of the congestion window on path i. This same expression is used to stripe packets even when bytes_in_nw$_i$ exceeds $w_i$ to ensure load balancing on the paths. At step 404, the entry node 206 then selects a path using the corresponding relay node (i.e., $208_1$ or $208_2$) to send the packet to the exit node 210. At step 406, the entry node 206 encapsulates the packets and at step 408 routes the packet the appropriate relay node. Each encapsulated packet carries a multipath header that contains a packet type (representing data, probe, lost signal, and the like), a timestamp (representing the time the packet left the entry node 206), and a path identifier (i.e., the IP address of the relay node). This header permits the exit node 210 to identify the path which the packet traversed through the network, and to detect and associate congestion on the path based on the delay observed for this packet. In the example shown in FIG. 2, packet $P_1$ traverses a path from the entry node 206 to the exit node 210 via relay node $208_1$ and packet $P_2$ traverses a path from the entry node 206 to the exit node 210 via relay node $208_2$.

Reordering

Figure 5:
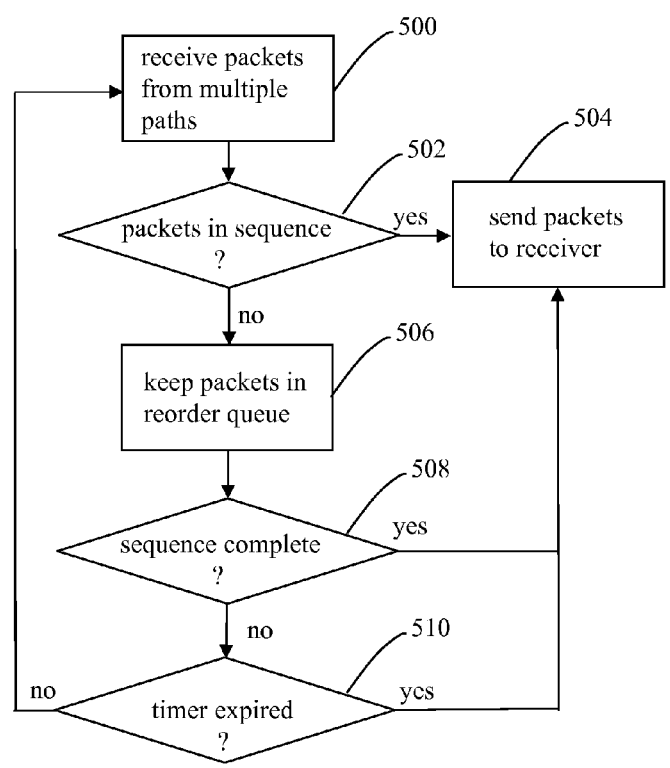
FIG. 5 is a flow diagram of a process for receiving packets at the exit node in the network of FIG. 2.

Packets that are sent on multiple paths with different latencies can arrive out of order and cause the receiver to send duplicate acknowledgements to the sender. Such duplicate acknowledgements falsely indicate packet loss and can lead to a substantial reduction of the congestion window, thereby reducing throughput. In accordance with an aspect of the invention, packets received from multiple paths are reordered at the exit node 210 prior to being communicated to the receiver 204. In the example shown in FIG. 2, packets P1 and P2 are received from different paths 222 and 224. FIG. 5 is a flow diagram of a process for receiving packets at the exit node. At step 500, the packets are received at the exit node 210 from the different paths selected by the entry node 206. If the packets are in sequence at step 502, they are immediately sent to the receiver 204 at step 504. If not, these packets are kept in a reorder queue (block 211) at step 506 until a sequence is complete at step 508, or a timer expires at step 510. Since the reorder delay required at the exit node 210 is governed by the path with the longest delay, a timer is set to a value that is a factor ρ of the minimum delay on the longest path. The one-way delay for each path can be estimated at the entry node 206 (in cooperation with the exit node 210), and this value is then sent to the exit node 210.

Congestion Indication

To ensure fair allocation of resources, flows react to congestion signals and "back-off" to reduce their sending rate. This back-off is achieved by reacting to increased packet delays and packet losses.

Figure 6:
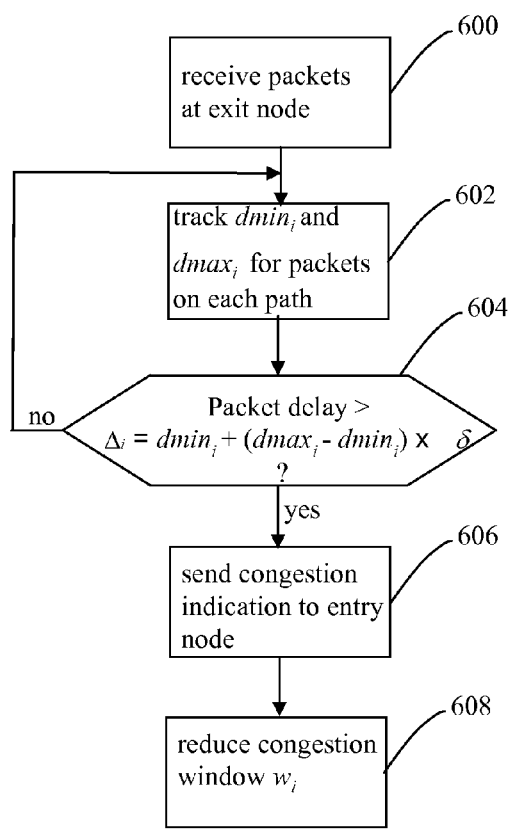
FIG. 6 is a flow diagram of process for estimating packet delays at the exit node.

FIG. 6 is a flow diagram of a process for estimating packet delays at the exit node 210. Each packet is timestamped (in the multipath header) at the entry node 206 prior to being communicated on one of the available paths 222, 224. At step 600, the exit node 210 receives packets from the entry node 206. At step 602, the exit node 210 calculates the one-way delay using the timestamp and the current time. At step 604, the exit node 210 keeps track of minimum ($dmin_i$) and maximum ($dmax_i$) delays observed by packets on each path for a connection. If, at step 604, a packet's delay is greater than $\Delta_i = dmin_i + (dmax_i - dmin_i) \times \delta$, where δ is a threshold parameter such that $\Delta_i$ is set to a small value, at step 606 the exit node 210 sends a congestion indication represented by 226 to the entry node 206. The congestion indication 226 can be indicated by either sending an explicit message from exit node 210 to entry node 206, or by piggybacking the congestion indication on a returning acknowledgment. It will be appreciated by those skilled in the art that the latter is preferred for efficiency. If there is congestion, then at step 608 the entry node implements the congestion control protocol described above to reduce the congestion window.

Figure 7:
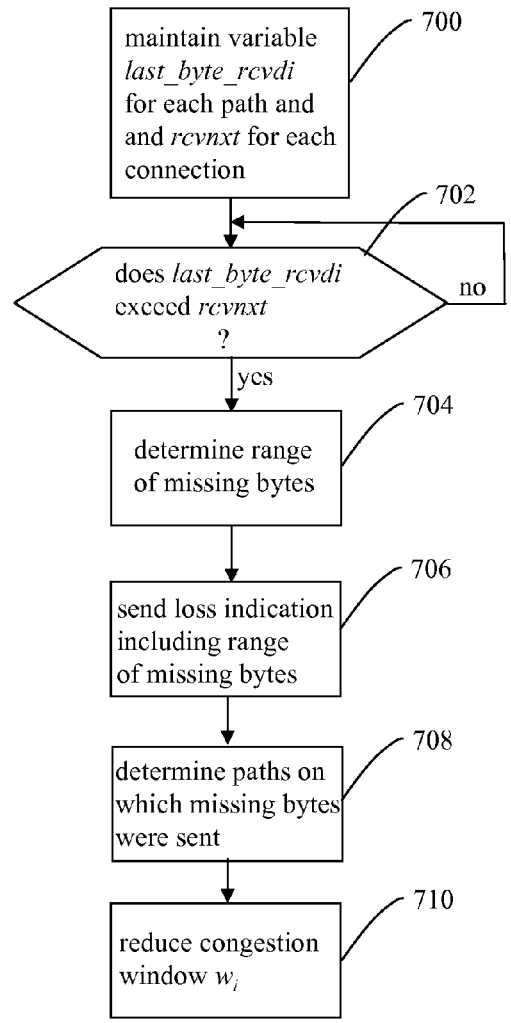
FIG. 7 is a flow diagram of a process for detecting packet loss at the exit node and determining which path the packet loss occurred at the entry node.

FIG. 7 is a flow diagram of a process for detecting packet loss at the exit node 210 and determining at the entry node 206 on which path the packet loss occurred. The exit node 210 maintains a reorder queue 211 and can thus detect packet losses earlier than the receiver 204. In this regard, at step 700 the exit node 210 maintains a variable $last\_byte\_rcvd_i$ for each path i that indicates the highest byte received on the path. The exit node further maintains a variable $last\_byte\_rcvd_i$ that indicates the next byte expected in the sequence. When the $last\_byte\_rcvd_i$ on each path exceeds rcvnxt at step 702, the exit node 210 detects a possible packet loss. At step 704, the exit node 210 determines the range of missing bytes from rcvnxt and the sequence number of the packet at the head of the reorder queue. At step 706, the exit node 210 sends a loss indication message containing the range of missing bytes. While the exit node 210 cannot exactly determine on which path the loss occurred, the range can be used at the entry node 206 to determine the path(s) on which the packets containing the missing bytes were sent. For each path on which any of the missing bytes were sent, at step 710 the congestion window is reduced at the entry node 206 as described above. As will be appreciated by those skilled in the art, this technique of detecting packet losses is simpler and faster than one that waits for and interprets duplicate acknowledgements from the receiver 204.

Congested-Path Suppression

To reduce the impact of congested paths on network throughput, whenever the congestion window for a path $w_i$ reaches a threshold MIN_CWND, the path is temporarily marked as "choked." No subsequent packets are sent on this path until it is "unchoked." From then on, a probe (unchoke request) with a timestamp is periodically sent on each choked path. If the probe does not perceive a delay greater than $\Delta_i$ described above, the exit node 210 returns an unchoke indication to the entry node 206. Otherwise, the exit node 210 drops the probe. Implementing choking and unchoking automatically handles path failures. No packets are sent on the failed path, and if an unchoke request does not reach the exit node 210, then no unchoke indication is sent back and the path remains choked from the perspective of the entry node 206. This feature is analogous to permitting the congestion window to drop below one.

Sender Rate Control

The techniques described above are independent of the congestion control algorithm that is implemented by the sender 202. This can lead to a mismatch between congestion windows between the sender 202 and the entry node 206. Such a mismatch can result in packet losses that reduce the congestion window at the sender 202, and thereby reduce the throughput achieved by the data transfer.

One way to overcome this mismatch is to ensure that the sender 202 does not send more bytes than the entry node's congestion window permits across all paths. In this regard, the entry node 206 can rewrite the TCP header in acknowledgments being returned to the sender 202 with a receiver window equal to the minimum of the window allowed by the entry node 206. To handle receiver window scaling employed by most bulk transfer applications, SYN packets can be monitored to check if the end-hosts exchange the scaling option, and the receiver window cube scaled accordingly and rewritten in the acknowledgements.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for facilitating large data transfers between a sender and a receiver through a network comprising an entry node communicating with the sender, an exit node communicating with the receiver, and a plurality of paths between the entry node and the exit node, at least one of the plurality of paths being via at least one relay node between the entry node and the exit node to provide multipath routing of packets between the entry node and the exit node, comprising the steps of:

receiving packets from the sender at the entry node;

at the entry node, selecting at least one path among the plurality of paths over which to send the packets to the exit node, the selection of the at least one path being a function of path congestion;

sending the packets from the entry node to the exit node via the at least one path among the plurality of paths between the entry node and exit node;

reordering the packets received at the exit node;

sending the reordered packets from the exit node to the receiver;

executing a multi-path congestion control protocol at the exit node to detect congestion on each path between the entry node and the exit node based on packet delays and packet losses;

executing a multipath congestion control protocol at the entry node to estimate the size of a congestion window for each path that indicates a stable sending rate for each path;

wherein the congestion control protocol at the entry node uses a multiplicative increase multiplicative decrease (MIMD) protocol for each path and the MIMD protocol comprises the steps of:

for each positive acknowledgement from the exit node to the entry node for a path i, incrementing a congestion window $w_i \leftarrow w_i + \alpha$ on path i by a parameter $\alpha$:

for packet delays from the entry node to the exit node for path i, decrementing the congestion window $w_i \leftarrow \max(1, w_i - \beta \times (w_i \times \xi + W \times (1-\xi)))$ on path i, by a multiplicative decrease parameter $\beta$ times the weighted sum of the congestion window $w_j$ on path j and the total congestion window on all paths W, where $$W = \sum_1^n w_i,$$

and $\xi$ is a variable controlling the multiplicative decrease on path i; and for packet losses from the entry node to the exit node for path i, decrementing the congestion window $w_i \leftarrow \max(1, w_i - W/2)$.

2. The method recited in claim 1, wherein $\xi = w_i/M_i$, where $M_i$ is the maximum congestion window size observed by a packet transfer on path i.

3. The method recited in claim 1, wherein the exit node estimates packet delays based on a timestamp for each packet received at the exit node and a current time.

4. The method recited in claim 3, wherein the exit node sends a congestion indication to the entry node if a packet is delayed by more than $\Delta_i = dmin_i + (dmax_i - dmin_i) \times \delta$, where $dmin_i$ is a minimum packet delay and $dmax_i$ is a maximum packet delay observed by the exit node for packets on path i, and $\delta$ is a threshold parameter.

5. The method recited in claim 1, further comprising the steps of:

at the exit node, maintaining a variable $last\_byte\_rcvd_i$ for each path i that indicates the highest packet received on path i;

maintaining a variable rcvnxt per connection with the entry node that indicates a next packet expected in the sequence;

if last_byte_rcvd exceeds rcvnxt, sending a packet loss indication to the entry node, the packet loss indication including a range of missing packets; and at the entry node, decrementing the congestion window $w_i$ or path i.

6. The method recited in claim 1, further comprising the step of upon the congestion window $w_i$ reaching a threshold value, stopping packets from being sent over path i.

7. The method recited in claim 1, further comprising the step of the entry node balancing load across the plurality of paths by choosing for each packet a path with a minimum $$\frac{bytes\_in\_nw_i}{w_i},$$

where $bytes\_in\_nw_i$ represents a number of $w_i$ unacknowledged bytes sent on path i.

* * * * *